Aug. 14, 1956   R. O. BIRCHLER ET AL   2,758,433
DEVICE FOR EJECTING AND STORING ARTICLES
Filed Oct. 4, 1951   2 Sheets-Sheet 1

INVENTORS:
R. O. BIRCHLER
A. J. FEDOR
BY
ATTORNEY

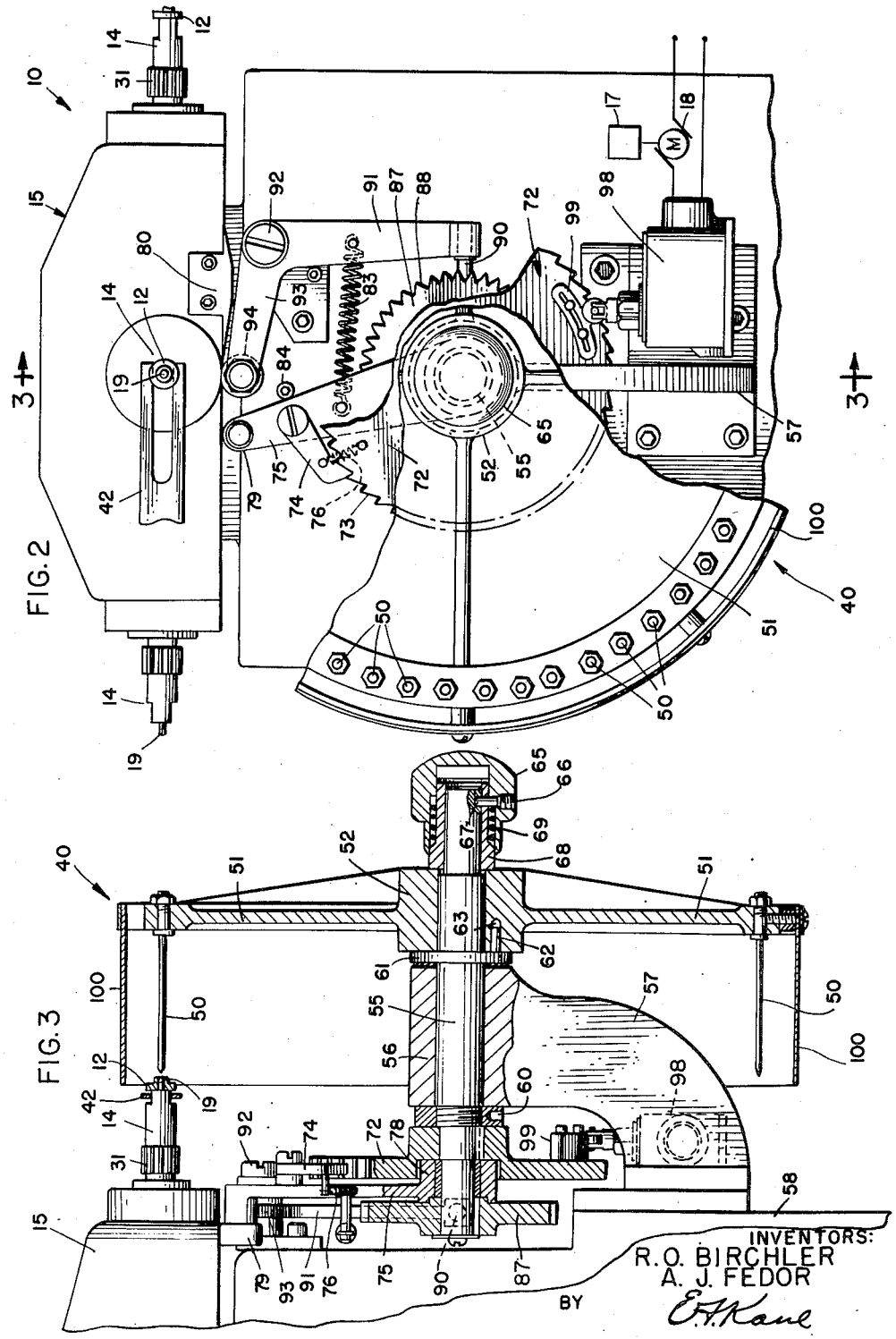

United States Patent Office
2,758,433
Patented Aug. 14, 1956

2,758,433
DEVICE FOR EJECTING AND STORING ARTICLES
Robert O. Birchler, Cicero, and Andrew J. Fedor, Chicago, Ill., assignors to Western Electric Company, Incorporated, New York, N. Y., a corporation of New York Application October 4, 1951, Serial No. 249,782
11 Claims. (Cl. 53—197)

This invention relates to a device for ejecting and storing articles and more particularly to a mechanism for ejecting number wheels from a marking machine and a magazine for receiving and storing the wheels.

It is an object of the present invention to provide a simplified mechanism for ejecting articles from a machine and storing the articles.

It is a further object of the invention to provide an improved device for receiving and storing articles ejected from a machine.

In accordance with one embodiment of the invention as applied to a marking machine for printing numerals on number wheels in which the wheels are supported on a plurality of work-holding spindles mounted on a turret which is indexed to advance the spindles and the wheels thereon from a loading station to a printing station and then to an unloading station where an arm, actuated in timed relation with the indexing of the turret, ejects the wheels from the spindles, there is provided at the unloading station, a magazine having a plurality of wheel-supporting rods arranged in a circle on a disk of the magazine in spaced and parallel relation to each other. The magazine is removably supported for rotation and is indexed by mechanism actuated by a cam on the turret head to advance the rods successively into alignment with the work-supporting spindles at the unloading station for receiving the wheels ejected from the spindles. When the magazine is full after one complete revolution thereof, a cam rotated with the magazine actuates a switch to stop the marking machine and permit the removal of the full magazine and the replacement of an empty one.

Other objects and advantages of the invention will become apparent by reference to the following detailed description thereof when considered in conjunction with the accompanying drawings illustrating a preferred embodiment thereof, in which Fig. 1 is a plan view of the marking apparatus with the magazine in position thereon;

Fig. 2 is an enlarged side elevational view of a portion of the apparatus shown in Fig. 1 with parts broken away;

Fig. 3 is a vertical sectional view taken on the line 3—3 of Fig. 2; and

Figure 1:
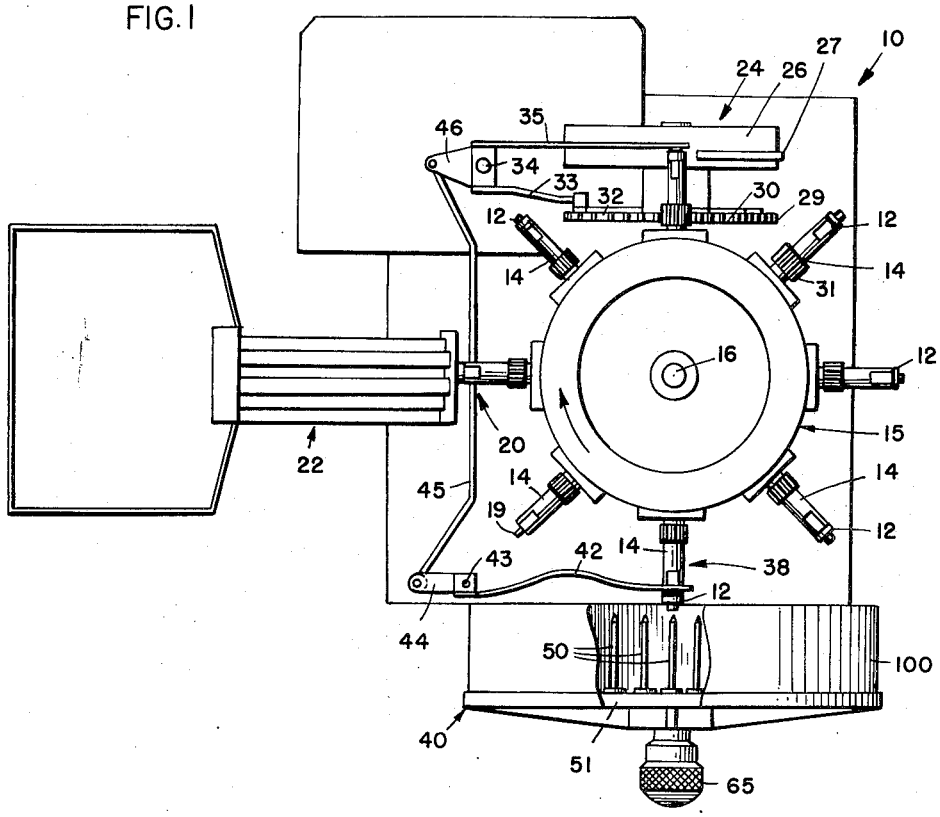
Figure 4:
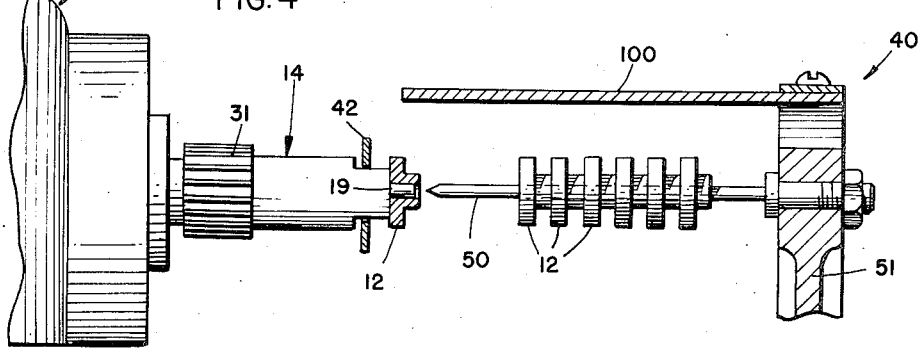
Fig. 4 is an enlarged detailed view of a portion of the mechanism shown in Fig. 3.

Referring to Fig. 1 of the drawings, the invention is shown applied to a marking machine 10 for printing numerals to the periphery of number wheels 12. The marking machine 10 comprises a plurality of spindles 14 mounted for rotation about their axes on a turret head 15 which is mounted on a shaft 16 and is intermittently indexed by a suitable drive mechanism indicated diagrammatically at 17 from a motor 18 (Fig. 2). The spindles 14, each have a pin 19 projecting from one end thereof adapted to fit into the bore of a wheel 12 for supporting the wheel on the spindle. The wheels 12 are applied to the spindles 14 at a loading station 20 by a feed mechanism 22 disclosed in the copending application of Birchler-Fedor, Serial No. 249,781, filed October 4, 1951.

As the turret 15 is indexed the spindles 14 and the wheels 12 thereon are carried to a printing station 24 where the numerals are printed thereon. A printing wheel 26 having a segmental type plate 27 thereon is actuated in timed relation to the actuation of the turret head 15 and during the dwell portion thereof to print a set of numerals onto the wheel 12. A disk 29 rotatable with the printing wheel 26 has a gear segment 30 thereon which meshes with gears 31 on the spindles 14 to rotate the spindles and wheels 12 during the printing operation. A cam 32 on the face of the disk 30 actuates a cam lever 33 mounted for oscillatable movement about a pivot 34 to oscillate an arm 35, one end of which is adapted to engage and hold the wheel 12 on the spindle during the printing operation. After the numerals have been printed on the wheels, the wheels are advanced through several idle stations and arrive at an unloading station 38 where the wheels 12 are ejected from the spindles into a magazine 40 by an ejector arm 42. The arm 42 is mounted for oscillatable movement about a pivot 43 and is connected through a lever 44, a link 45, and an arm 46 to the cam lever 33 for actuation therewith. One end of the arm 42 is slotted to fit over the reduced ends of the spindles 14 and engage the rear face of the wheels during the ejection of the wheels.

From the description thus far, it will be seen that during the dwell portion of successive indexing cycles of the apparatus, the wheels 12 are applied to successive spindles at the loading station, numerals are printed to the periphery thereof at the printing station, and the printed wheels are ejected from the spindles into the magazine at the unloading station.

The magazine 40 comprises a plurality of pins or rods 50 secured to a disk 51 and arranged thereon in a circle in parallel and equally spaced relation to each other. The disk 51 has an apertured hub 52 and is removably supported on a shaft 55 which is rotatably mounted in a bearing aperture 56 formed in the upper end of a bracket 57, which in turn is secured to the stationary frame member 58 of the marking machine. The shaft 55 is held against axial displacement in the bracket 67 by a lock nut 60 threadedly secured to the shaft and a collar 61 formed on the shaft. A pin 62 on the collar 61 fits into a recess or socket 63 in the hub 52 of the disk to connect the disk 51 and the magazine 40 for rotation with the shaft. A hollow handle or knob 65 having a pin 66 for engaging in a bayonet slot 67 and having a sleeve 68 urged against the hub 52 of the disk 51 by a spring 69, serves to removably lock the magazine 40 on the shaft for rotation therewith.

Each of the rods 50 has a tapered forward end and is arranged to receive and support the eight wheels 12 ejected from the spindles 14 during one complete revolution of the turret 15. The rods 50 of the magazine are adapted to be aligned successively with the spindle 14 at the unloading station and an indexing mechanism is provided which is operable for each revolution of the turret head 15 to advance the magazine to move the rod 50 loaded with the wheels thereon from the loading station and align an empty rod therewith. A ratchet wheel 72 is keyed to the shaft 55 and has a plurality of teeth 73 thereon equal in number to the number of rods 50. The teeth 73 are successively engageable with a pawl 74 pivotally connected to an actuating arm 75 and yieldably maintained in engagement with the teeth by a tension spring 76. The actuating arm 75 which has an apertured hub 78 is pivotally supported on the shaft 55 and has a cam roller 79 rotatably mounted on its upper end. The arm 75 is disposed at a slight angle from vertical and the cam roller 79 thereon is positioned below and at the edge of the turret head 15 and in the path of travel of a cam 80 (Fig. 2) secured to the turret head for rotation therewith. The cam 80 is so proportioned as to engage the roller 79 and impart a predetermined arcuate movement to the actuating arm 75 to index the ratchet wheel 72 and the magazine 40 and advance another rod 50 to the unloading station. A tension spring 83 connected to the actuating arm 75 serves to move the arm in a reverse direction, which movement is arrested by a stop pin 84.

Mechanism is provided for accurately positioning the magazine after each indexing movement imparted thereto by the actuating arm 75 to accurately align the rods 50 co-axially with the spindles 14 at the unloading station. This mechanism comprises a centering wheel or disk 87 keyed to the shaft 55 and having a number of regularly shaped V-shaped teeth 88 thereon equal in number to the number of pins 50. The teeth 88 have slanting sides thereon forming V-shaped grooves therebetween into which a V-shaped centering member 90 is adapted to be moved to accurately position the centering wheel 87 and the magazine in predetermined angular positions. The centering element 90 is fixed to one arm 91 of a bell crank pivotally mounted for oscillation on a stud 92 secured to the stationary frame member 58 of the marking machine. The other arm 93 of the bell crank has a roller 94 rotatably mounted thereon which roller is positioned in the path of rotation of the cam 80 so as to cause the actuation of the bell crank during each revolution of the turret head 15. One end of the spring 83 is connected to the arm 91 of the bell crank and serves to rock the bell crank about its pivot in a clockwise direction and cause the element 90 to engage in the V-shaped grooves between the teeth 88 to effect the accurate positioning of the centering disk 87 and the alignment of the rods 50 with the spindles 14 at the unloading station. The parts, including the cam 80, the bell crank 91, and the actuating arm 75, are so arranged that the bell crank is actuated to disengage the centering element 90 from the teeth 88 and space it from the centering disk 87 while the arm 75 is actuated to index the magazine and position the following V-shaped groove 88 of the disk 87 in the path of movement of a centering element 90, after which the cam releases and the spring 83 returns the bell crank and the actuating arm 75 to effect the accurate positioning of the magazine.

A normally closed switch 98 is connected in series with the driving motor 18 of the marking machine and a cam 99 mounted on the ratchet wheel 72 is adapted to actuate the switch 98 once during each complete revolution of the magazine 40 to open the motor circuit and stop the marking machine. This safety device insures that after each of the rods 50 has received a group of eight wheels 12 ejected from the marking machine and the magazine is full, additional wheels cannot be fed onto the rods 50. When the magazine is full the locking handle 65 may be removed from the shaft after which the loaded magazine may be removed and an empty magazine substituted therefor and locked in position on the shaft. A cylindrical guard 100 may be secured to the disk 51 to enclose and protect the rods 50. The full magazine may then be placed in storage space until the wheels therein are needed or the magazine may be used to support the wheels while being processed further, as, for example, while baking the numerals applied to the wheels.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus having a plurality of article supporting elements mounted on an intermittently actuated carrier for moving successive elements and articles thereon to an unloading station and having means for ejecting said articles from said elements at said unloading station, the combination therewith of a magazine having a plurality of parallel and uniformly spaced rods arranged in a circle for receiving the articles ejected from said elements at said unloading station, means for removably supporting said magazine for rotation in a predetermined position to guide the rods on said magazine successively into said unloading station, cam means on said carrier, and means actuated by the cam means on said carrier for indexing said magazine to advance successive rods thereon into said unloading station.

2. In an apparatus having a plurality of article supporting elements mounted on an intermittently actuated carrier for moving successive elements and articles thereon to an unloading station and having means for ejecting said articles from said elements at said unloading station, the combination therewith of a magazine having a plurality of parallel and uniformly spaced rods arranged in a circle for receiving the articles ejected from said elements at said unloading station, means for removably supporting said magazine in a predetermined position for rotation to guide the rods on said magazine successively into said unloading station, cam means on said carrier, means actuated by said cam means on said carrier for indexing said magazine to advance successive rods thereon into said unloading station, means actuated by said cam means on said carrier for locating and holding said magazine in a predetermined angular position after successive indexing movements of said magazine to accurately align successive rods with the elements and the articles thereon at said unloading station, and control means including means rotatable with said magazine for stopping the actuation of said carrier in response to a predetermined arcuate movement of said magazine.

3. In an apparatus having a plurality of article supporting elements mounted on an intermittently actuated carrier for moving successive elements and articles thereon to an unloading station and having means for ejecting said articles from said elements at said unloading station, the combination therewith of a magazine having a plurality of parallel and uniformly spaced rods arranged in a circle for receiving the articles ejected from said elements at said unloading station, means for removably supporting said magazine in a predetermined position for rotation to guide the rods on said magazine successively into said unloading station, cam means on said carrier, means actuated by said cam means on said carrier for indexing said magazine to move successive rods thereon into said unloading station, and means actuated by said cam means on said carrier for locating and holding said magazine in predetermined angular positions after successive indexing movements of said magazine to accurately align successive rods with the elements and the articles thereon at said unloading station.

4. In an apparatus having a turret provided with a plurality of spindles for supporting articles, drive means including an electric motor for indexing said turret to move successive spindles into an unloading station, means for ejecting the articles from said carriers at said unloading station, the combination therewith of a magazine having a plurality of parallel article supporting elements spaced equi-angularly and equi-distant from an axis passing through said magazine, means for suporting said magazine for rotation in a predetermined position to guide the elements in said magazine successively into alignment with said unloading station to receive the articles ejected at said station, a cam mounted on asid turret for rotation therewith, means actuated by said cam for indexing said magazine to advance successive elements thereon to said unloading station, means actuated by said cam for accurately positioning said magazine in predetermined angular positions after successive indexing movements to accurately align successive rods thereon at said unloading station, and control means including means rotatable with said magazine for stopping the actuation of said turret in response to one revolution of said magazine.

5. In an apparatus having a plurality of spindles mounted on a turret driven from an electric motor and indexible to move successive carriers into an unloading station and having means for ejecting the articles from said spindles at said unloading station, the combination therewith of a magazine having a plurality of parallel, uniformly spaced rods arranged in a circle, means for supporting said magazine in a predetermined position for rotation about an axis concentric to said circle of rods to guide the rods in said magazine successively into alignment with said unloading station to receive the articles ejected at said station, a cam mounted on said turret for rotation therewith, means actuated by said cam for indexing said magazine to advance successive rods thereon to said unloading station, and control means including a switch connectible to said motor and means rotatable in timed relation with said magazine for actuating said switch to stop said motor in response to a predetermined movement of said magazine.

6. In an apparatus having an intermittently movable device provided with a plurality of article supporting elements for advancing said articles to an unloading station and having means for ejecting said parts at said unloading station, the combination therewith of a rotatable magazine having a plurality of holders for receiving the parts ejected from the supporting elements, a shaft, means removably securing said magazine to said shaft for rotation therewith, means for rotatably supporting said shaft in a predetermined position to guide successive ones of said holders of said magazine on said shaft into alignment with said unloading station, a ratchet wheel fixed to said shaft, a lever having a pawl co-operable with said ratchet wheel for indexing said shaft and said magazine in response to a predetermined movement of said actuating lever, an aligning member on said shaft having a plurality of uniformly spaced recesses, a movable arm having a part thereof engageable in the recesses of said aligning member to accurately locate said shaft and magazine in predetermined angular positions, actuating means including cam means movable with said intermittently movable device for actuating said lever and said arm in timed relation to the actuation of said device to effect the indexing and aligning of said magazine.

7. In an apparatus having an intermittently movable carrier provided with a plurality of article supporting elements for advancing said articles to an unloading station and having means for ejecting said parts at said unloading station, the combination therewith of a rotatable magazine having a plurality of holders arranged in a circle for receiving the articles ejected from supporting elements, a shaft mounted in a predetermined position for rotatably supporting said magazine to guide successive ones of said holders into alignment with said unloading station, means removably securing said magazine onto said shaft for rotation therewith, a feed ratchet wheel fixed to said shaft, a lever having a pawl co-operable with said ratchet for indexing said shaft and said magazine in response to a predetermined movement of said lever, a positioning disc fixed to said shaft having uniformly spaced V shaped recesses in the periphery thereof, a movable arm having a part thereof engageable in the recesses in said positioning disc after each indexing movement of said magazine to accurately locate said shaft and said magazine in predetermined angular positions, a cam element movable with said intermittently movable device for actuating said lever and said arm individually in one direction, and spring means operable to move the lever and the arm individually in the opposite direction, said cam element and spring means serving to actuate the lever and the arm in timed relation to the actuation of said intermittently movable device to effect the indexing and aligning of said magazine.

8. In an apparatus having a plurality of article supporting spindles mounted on an intermittently actuated carrier for moving successive spindles and articles thereon to an unloading station and having means for ejecting said articles from said elements at said unloading station, the combination therewith of a magazine having a plurality of parallel article supporting elements spaced equi-angularly about and equi-distant from an axis passing through said magazine, means for removably supporting said magazine on said apparatus in a predetermined position for rotation about said axis to guide the elements in said magazine successively into alignment with the spindles and articles at said unloading station to receive the articles ejected from the spindles at said station, cam means mounted on said carrier for movement therewith, and means actuated by said cam means on said carrier for indexing said magazine to advance successive elements thereon to said unloading station.

9. In an apparatus having a plurality of article supporting spindles mounted on an intermittently actuated carrier for moving successive spindles and articles thereon to an unloading station and having means for ejecting said articles from said elements at said unloading station, the combination therewith of a magazine having a plurality of parallel article supporting elements spaced equi-angularly about and equi-distant from an axis passing through said magazine, means for removably supporting said magazine on said apparatus in a predetermined position for rotation about said axis to guide the elements in said magazine successively into alignment with said unloading station to receive the articles ejected from the spindles at said station, actuator means mounted on said carrier for movement therewith, means actuated by said actuator means on said carrier for indexing said magazine to advance successive elements thereon to said unloading station, and control means including means rotatable with said magazine for stopping the actuation of said carrier in response to a predetermined arcuate movement of said magazine.

10. In an apparatus having a plurality of article supporting spindles mounted on an intermittently actuated carrier for moving successive spindles and articles thereon to an unloading station and having means for ejecting said articles from said elements at said unloading station, the combination therewith of a magazine having a plurality of parallel article supporting elements spaced equi-angularly about and equi-distant from an axis passing through said magazine, means for removably supporting said magazine on said apparatus in a predetermined position for rotation about said axis to guide the elements in said magazine successively into alignment with the spindles and articles at said unloading station to receive the articles ejected from the spindles at said station, actuator means mounted on said carrier for movement therewith, means actuated by said actuator means on said carrier for indexing said magazine to advance successive elements thereon to said unloading station, means actuated by said actuator means on said carrier for locating and holding said magazine in predetermined angular positions after successive indexing movements to align successive elements thereon with the spindles at said unloading station, and control means including means rotatable with said magazine for stopping the actuation of said carrier in response to a predetermined arcuate movement of said magazine.

11. In an apparatus having a plurality of article supporting elements mounted on an intermittently actuated carrier for moving successive elements and articles thereon to an unloading station and having means for ejecting said articles from said elements at said unloading station, the combination therewith of article receiving means having a plurality of parallel and uniformly spaced elongated members for receiving the articles ejected from said elements at said unloading station, means for supporting said article receiving means for movement to guide the members thereon successively into said unloading station, and means actuated in response to a predetermined movement of said carrier for indexing said article receiving means to advance successive members thereon into said unloading station.

References Cited in the file of this patent

UNITED STATES PATENTS

| Number | Name | Date |
| --- | --- | --- |
| 1,433,642 | Olson | Oct. 31, 1922 |
| 1,749,620 | Winslow | Mar. 4, 1930 |
| 2,349,456 | Olson | May 23, 1944 |
| 2,565,786 | Spartalis | Aug. 28, 1951 |